US012651586B2

(12) United States Patent
Liang et al.

(10) Patent No.: US 12,651,586 B2
(45) Date of Patent: Jun. 9, 2026

(54) PERSONAL ELECTRONIC DEVICE ENHANCING CALL PRIVACY

(71) Applicant: xMEMS Labs, Inc., Santa Clara, CA (US)

(72) Inventors: Jemm Yue Liang, Sunnyvale, CA (US); Chieh-Yao Chang, Taipei (TW); JengYaw Jiang, Saratoga, CA (US)

(73) Assignee: xMEMS Labs, Inc., Santa Clara, CA (US)

( * ) Notice: Subject to any disclaimer, the term of this patent is extended or adjusted under 35 U.S.C. 154(b) by 0 days.

(21) Appl. No.: 19/228,773

(22) Filed: Jun. 5, 2025

(65) Prior Publication Data

US 2025/0378812 A1      Dec. 11, 2025

Related U.S. Application Data

(60) Provisional application No. 63/676,414, filed on Jul. 28, 2024, provisional application No. 63/673,179, filed on Jul. 19, 2024, provisional application No. 63/658,449, filed on Jun. 11, 2024.

(51) Int. Cl.
| | |
|---|---|
| *G10K 11/175* | (2006.01) |
| *G10K 11/178* | (2006.01) |
| *G10L 15/02* | (2006.01) |
| *G10L 15/04* | (2013.01) |

(52) U.S. Cl.
CPC .... *G10K 11/1754* (2020.05); *G10K 11/17854* (2018.01); *G10L 15/02* (2013.01); *G10L 15/04* (2013.01); *G10L 2015/025* (2013.01)

(58) Field of Classification Search
CPC ........................ G10K 11/1752; G10K 11/1754
See application file for complete search history.

(56) References Cited

U.S. PATENT DOCUMENTS

| | | | |
|---|---|---|---|
| 8,824,666 B2 | 9/2014 | Conte | |
| 2006/0109983 A1 | 5/2006 | Young | |
| 2013/0259254 A1 | 10/2013 | Xiang | |
| 2014/0257802 A1 | 9/2014 | Asada | |
| 2018/0268836 A1* | 9/2018 | Krasnov | ................ G10L 21/16 |
| 2021/0248989 A1 | 8/2021 | Moeller | |
| 2023/0008818 A1 | 1/2023 | Song | |

FOREIGN PATENT DOCUMENTS

| | | | | |
|---|---|---|---|---|
| CN | 116684514 A | * | 9/2023 | .............. H04M 1/19 |
| TW | M400639 U1 | | 3/2011 | |

* cited by examiner

*Primary Examiner* — Kile O Blair
(74) *Attorney, Agent, or Firm* — Winston Hsu

(57) ABSTRACT

A personal electronic device includes a main sound producing device, configured to produce an intended sound for an intended user; and an auxiliary sound producing device, configured to produce a masking sound or an anti-sound to reduce a speech intelligibility of a bystander within a neighborhood of the intended user of the personal electronic device.

20 Claims, 13 Drawing Sheets

PERSONAL ELECTRONIC DEVICE ENHANCING CALL PRIVACY

CROSS REFERENCE TO RELATED APPLICATIONS

This application claims the benefit of U.S. Provisional Application No. 63/658,449, filed on Jun. 11, 2024. Further, this application claims the benefit of U.S. Provisional Application No. 63/673,179, filed on Jul. 19, 2024. Further, this application claims the benefit of U.S. Provisional Application No. 63/676,414, filed on Jul. 28, 2024. The contents of these applications are incorporated herein by reference.

BACKGROUND OF THE INVENTION

1. Field of the Invention

The present application relates to a personal electronic device, and more particularly, to a personal electronic device capable of enhancing call privacy.

2. Description of the Prior Art

Unless otherwise indicated herein, the approaches described in this section are not prior art to the claims in this application and are not admitted as prior art by inclusion in this section.

For mobile phone users, call privacy holds significant importance, particularly within confined public spaces such as elevators. In such environments, the risk of unintended eavesdropping escalates considerably. The close proximity of other individuals means private conversations—whether concerning financial details, health matters, or sensitive work discussions—can be easily overheard.

This lack of privacy can lead to serious repercussions. Overheard information could potentially be exploited for identity theft, targeted scams, or corporate espionage. Unintended disclosure of confidential information may result in social awkwardness, professional consequences, or even security breaches. Furthermore, the awareness of being overheard can severely impact freedom of expression, creating hesitation when discussing important matters openly. Ultimately, robust call privacy measures are essential for ensuring mobile conversations remain secure and confidential, irrespective of one's physical surroundings.

Therefore, there is a need to enhance call privacy.

SUMMARY OF THE INVENTION

It is therefore a primary objective of the present application to provide a personal electronic device, to improve over disadvantages of the prior art.

An embodiment of the present application provides a personal electronic device. The personal electronic device includes a main sound producing device, configured to produce an intended sound for an intended user; and an auxiliary sound producing device, configured to produce a masking sound or an anti-sound to reduce a speech intelligibility of a bystander within a neighborhood of the intended user of the personal electronic device.

An embodiment of the present application provides a personal electronic device. The personal electronic device includes a plurality of auxiliary sound producing devices, configured to perform an acoustic beamforming operation and to form at least an acoustic beam; wherein the at least an acoustic beam is configured to nullify or minimize an acoustic energy toward an angular direction of a bystander, to reduce a speech intelligibility of the bystander.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
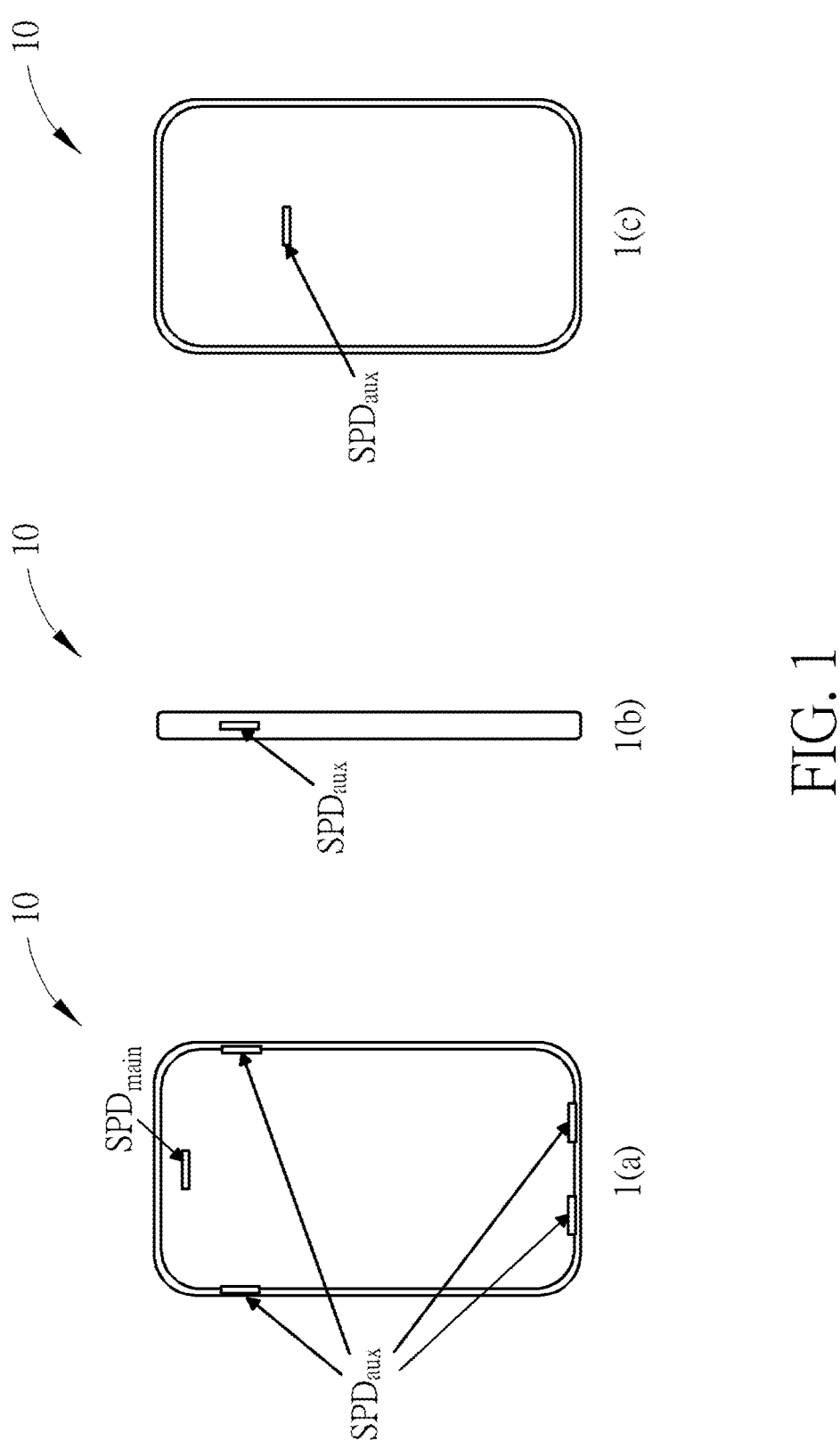
FIG. 1 is a schematic diagram of a personal electronic device according to an embodiment of the present application.

FIG. 1 illustrates schematic diagrams of a front side (1(*a*)), a side edge (1(*b*)) and a back side (1(*c*)) of a personal electronic device 10 according to an embodiment of the present application. In the embodiment shown in FIG. 1, the personal electronic device 10 is a phone. The personal electronic device 10 comprises a main sound producing device $SPD_{main}$ and auxiliary sound producing devices $SPD_{aux}$. In an embodiment, the main or auxiliary sound producing device may produce sound via generating a plurality of air pulses. In other words, the main or auxiliary sound producing device may be realized by air-pulse generating (APG) device, e.g., the air-pulse generating device taught in U.S. application Ser. No. 18/321,759, Ser. No. 18/829,245, etc., which has benefit of its compact size and is not limited thereto.

The main sound producing device $SPD_{main}$ is usually known as receiver of the phone, which is usually disposed on the front side of the phone to produce voice sound of another person on a phone call. The voice sound of another person is recognized as an intended sound for an intended user, where the intended user in the present application is usually referred to the phone holder/user, and vice versa.

The auxiliary sound producing device $SPD_{aux}$ may be disposed on a bottom edge or a side edge of the personal electronic device (as shown in FIGS. 1(a) and 1(b)) or on a back side of the personal electronic device (as shown in FIG. 1(c)), so as to produce a sound toward an ambient of the personal electronic device 10. The auxiliary sound producing device $SPD_{aux}$ is configured to produce the sound in order to destroy/reduce speech intelligibility of bystander. The sound produced by the auxiliary sound producing device $SPD_{aux}$ may be or comprise an anti-sound (corresponding to the intended sound for the intended user), a masking sound (which will be detailed later), or a combination of both.

In the present application, bystander may refer to unintended listener within a neighborhood of the intended user of the personal electronic device (e.g., 10).

Note that, in the embodiment shown in FIG. 1, the personal electronic device 10 comprises multiple auxiliary sound producing devices, which is not limited thereto. Numbers, locations and/or arrangement of the auxiliary sound producing devices may be designed according to practical requirements. As long as the personal electronic device comprises at least one auxiliary sound producing device and the auxiliary sound producing device is configured to produce masking sound or anti-sound to destroy/reduce speech intelligibility of bystander within neighborhood of user of the personal electronic device, it is within the scope of the present invention.

Note that, the personal electronic device is not limited to being phone. The personal electronic device may be personal computer, tablet computer, smart wearable device such as smart watch, smart band, smart glasses, etc. As long as the personal electronic device can perform voice phone call, it is within the scope of the present invention.

Figure 2:
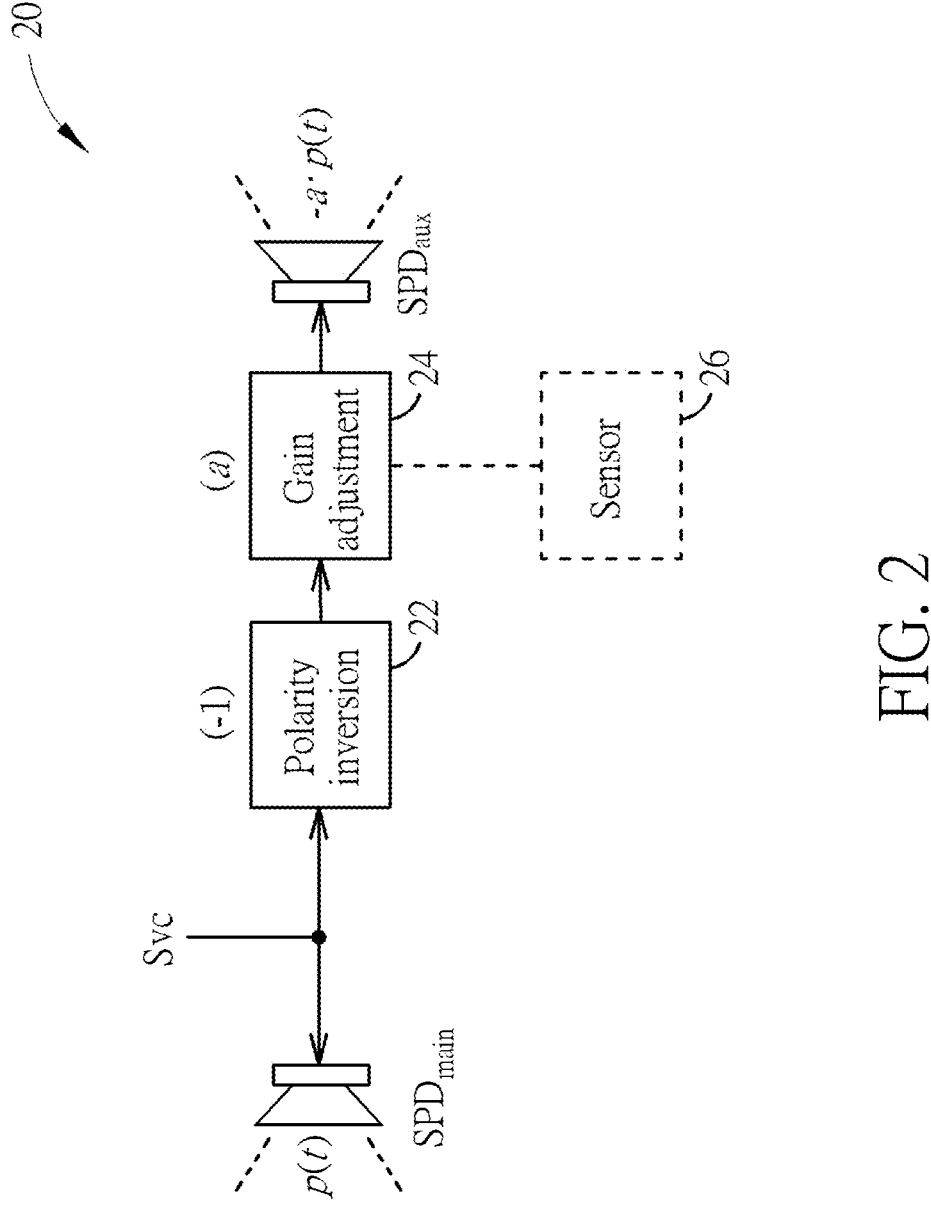
FIG. 2 is a schematic diagram of a personal electronic device according to an embodiment of the present application.

FIG. 2 illustrates a schematic diagram of a personal electronic device 20 according to an embodiment of the present application. The personal electronic device 20 demonstrates an embodiment of producing anti-sound, corresponding to the intended sound for the intended user. In addition to the main sound producing device $SPD_{main}$ and the auxiliary sound producing device $SPD_{aux}$, the personal electronic device 20 comprises a polarity inversion circuit 22 and a gain adjustment circuit 24.

The main sound producing device $SPD_{main}$ produces an intended sound p(t) according to a voice call signal Svc, where the voice call signal Svc may be obtained from a modem (bridging the personal electronic device with a communication network system) of the personal electronic device 20 (not shown in FIG. 2).

On the other hand, the polarity inversion circuit 22 and the gain adjustment circuit 24 work together so that the auxiliary sound producing device $SPD_{aux}$ produces an anti-sound $-a \cdot p(t)$, where the negative sign "−" is contributed from the polarity inversion circuit 22 and the gain factor or amplitude "a" is contributed from gain adjustment circuit 24.

The purpose of the anti-sound $-a \cdot p(t)$ is to cancel the intended sound p(t) radiated from the main sound producing device $SPD_{main}$ ideally, or at least to interfere the intended sound p(t) destructively so that acoustic energy (corresponding to the intended sound p(t) or the voice call signal Svc) perceived by the bystander is lowered. Furthermore, the purpose of the anti-sound $-a \cdot p(t)$ is to reduce the acoustic energy perceived by the bystander below a certain level such that it is speech unintelligible for the bystander.

The amplitude "a" may be determined according to practical situation. For example, amplitude of the anti-sound "a" may be estimated by considering the propagation decay, 1/r path loss, and/or passageway blockage between the auxiliary sound producing device $SPD_{aux}$ and ear canal opening of the phone user. In an embodiment, a (proximity) sensor 26 may be included to detect whether the phone is attached to the phone users' ear. The gain adjustment block/circuit 24 may determine $a=a_1$ if the (proximity) sensor 26 detects positive (for path loss and blockage) or determine $a=a_2$ if the (proximity) sensor 26 detects negative (for path loss only).

Instead of sound cancelling, sound masking may be used to reduce speech intelligibility.

Sound masking and sound cancelling are different concepts. Sound cancelling is generating anti-sound (e.g., $-a \cdot p(t)$) with opposite polarity of the to-be-cancelled sound (e.g., p(t)) so that aggregated acoustic result is reduced and less discernible. Sound masking, on the other hand, may be for example adding specially tuned sound engineered to match the frequency of human speech, so as to reduce speech intelligibility. Furthermore, sound masking or auditory masking (in the field of psychoacoustic) represents a concept that one sound is no longer perceived due to presence of another sound.

In order to reduce speech intelligibility, the auxiliary sound producing device $SPD_{aux}$ may produce masking noise or jamming noise as masking sound.

Figure 3:
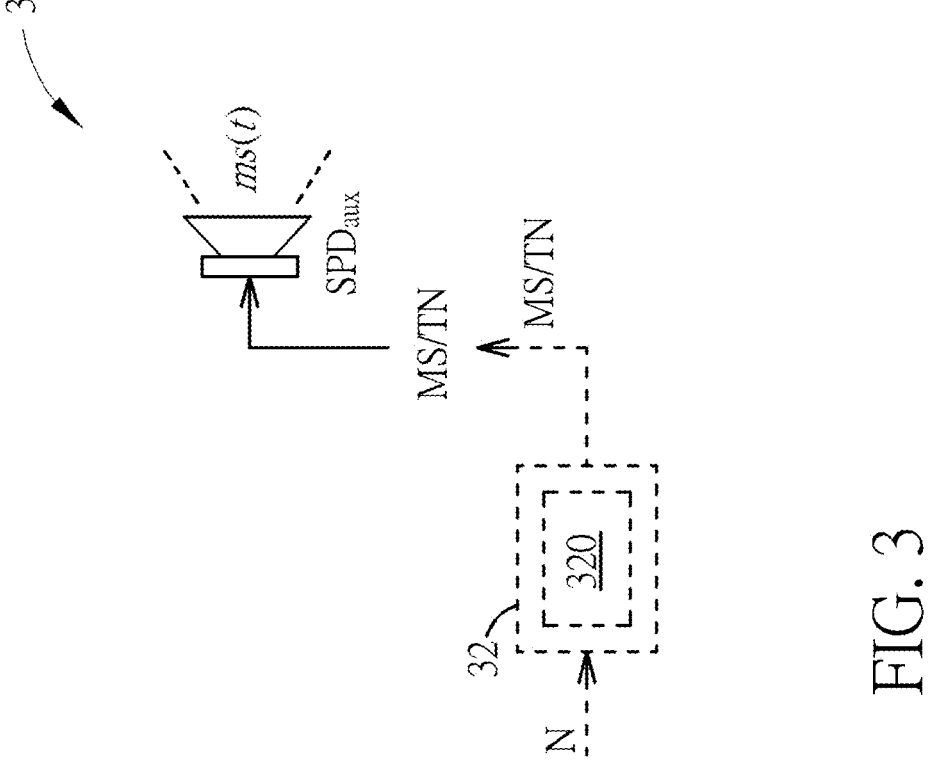
FIG. 3 is a schematic diagram of a personal electronic device according to an embodiment of the present application.
Figure 3:
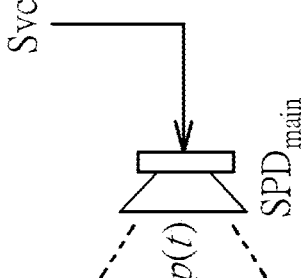

FIG. 3 illustrates a schematic diagram of a personal electronic device 30 according to an embodiment of the present application. Different from the personal electronic device 20 where the auxiliary sound producing device $SPD_{aux}$ produces anti-sound, the auxiliary sound producing device $SPD_{aux}$ within the personal electronic device 30 produces masking sound ms(t), according to a masking sound signal MS. In an embodiment, the masking sound ms(t) is masking noise. In an embodiment, the masking noise is tuned noise engineered to match the frequency of human speech. In the embodiment shown in FIG. 3, the personal electronic device 30 comprises a masking sound generator 32 comprising a filter 320, which is configured to produce a tuned noise TN as the masking sound signal MS according to a wideband noise or a white noise N.

Note that, human voice comprises vowels and consonants. Frequency of consonants is usually higher than frequency of vowels, but acoustic energy of consonants is usually lower than that of vowels. Nevertheless, distinguishing consonants plays critical role in speech intelligibility. For example, words like "top", "pop" and "bob" share the same vowel but own different consonants, which brings different meanings thereof.

Human auditory is very sensitive in a spectrum band of consonant sound, usually 2-4 KHz. It can be validated by a plot of hearing threshold (in a quiet room) shown in FIG. 4, it is observed that hearing threshold is low in a spectrum band of 2-4 KHz, where some or many of the consonant frequencies lie.

Figure 4:
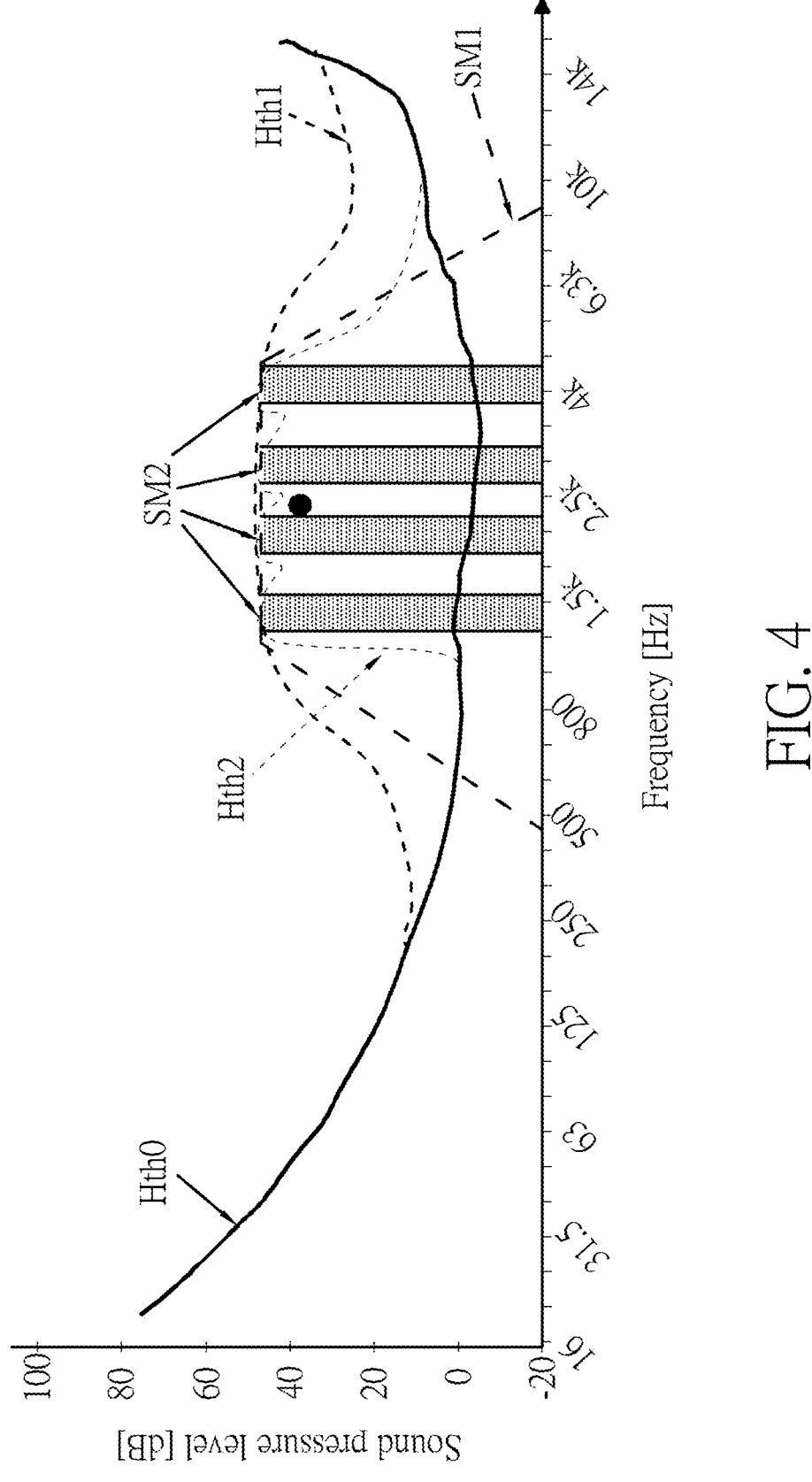
FIG. 4 illustrates a hearing threshold and spectrum of masking sound/noise.

To elaborate more, FIG. 4 illustrates a hearing threshold Hth0 in quiet room in terms of SPL (sound pressure level) versus frequency. The hearing threshold is known as minimum sound level of a pure tone that an average human ear with normal hearing can detect in a certain environment.

The hearing threshold Hth0 is low within a range of 800 Hz-6.3 KHz, where human auditory is sensitive in such spectrum band. In other words, a 2.5 KHz single tone with about 40 dB SPL can be clearly heard in the quiet room.

However, if there is noise with shaped spectrum such as spectrum SM1 or SM2 shown in FIG. 4, the hearing threshold would rise in response to spectrum SM1/SM2, such as hearing threshold Hth1/Hth2, which is higher than 40 dB around 2.5 KHz. In other words, the 40 dB 2.5 KHz single tone would no longer be hearable by human auditory, even if it exists, if noise with spectrum SM1/SM2 presents.

Inspired by FIG. 4, the purpose of the masking sound ms(t) or the tuned noise TN is to increase the human hearing threshold within particular spectrum band, such that voice of phone user (at least consonants of the phone user) is undiscernible or undecodable, which is known as spectral masking or simultaneous masking. The masking sound ms(t) or the tuned noise TN may have spectrum similar to SM1 or SM2. It means the masking sound ms(t) may comprise a bandlimited noise with a noise power concentrating within a noise band (similar to SM1), and the noise band may cover a spectrum of human voice or cover a spectrum of consonants of human voice. Or, the masking sound ms(t) may comprise a plurality of narrow band sounds at plurality of masking frequency tones (similar to SM2), and the plurality of masking frequency tones spreads over a consonant band (e.g., 2K-4K Hz) or a voice band (e.g., 250-8K Hz).

In the present application, some intelligibility index may be used to evaluate or quantify speech intelligibility, such as speech intelligibility index (SII), speech transmission index (STI), common intelligibility scale (CIS), etc., but not limited thereto.

Figure 5:
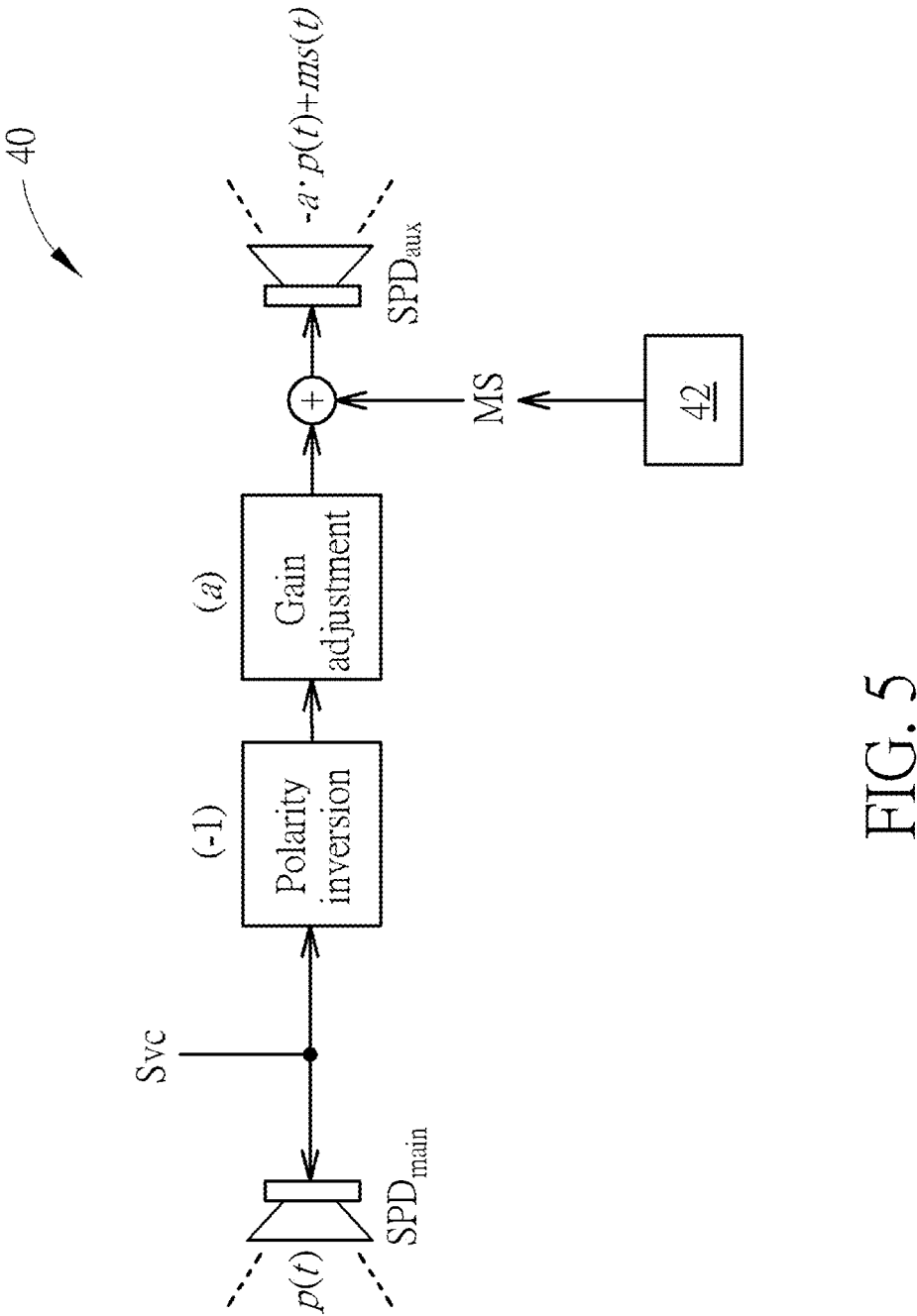
FIG. 5 is a schematic diagram of a personal electronic device according to an embodiment of the present application.

In an embodiment, the auxiliary sound producing device $SPD_{aux}$ may produce both anti-sound and masking sound. For example, FIG. 5 illustrates a schematic diagram of a personal electronic device 40 according to an embodiment of the present application. The personal electronic device 40, comprising a masking sound generator 42, may be regarded as an integration of the devices 20 and 30, and operational details are not narrated herein for brevity.

Note that, in the personal electronic device 20, the anti-sound is used to eliminate the sound produced by the main sound producing device $SPD_{main}$, which is not limited thereto. The auxiliary sound producing device $SPD_{aux}$ may produce anti-sound to eliminate voice sound of the phone user.

Figure 6:
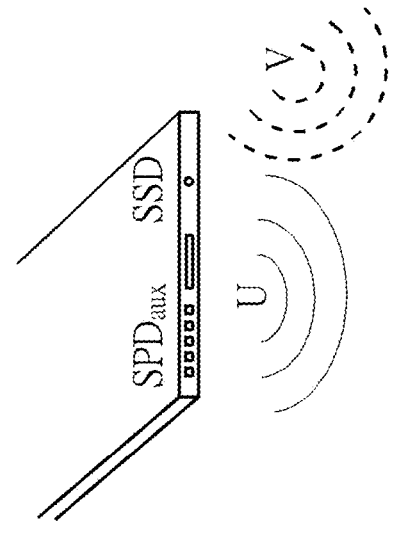
FIG. 6 illustrates scenarios of a voice sound and an anti-sound produced by an auxiliary sound producing device.
Figure 6:
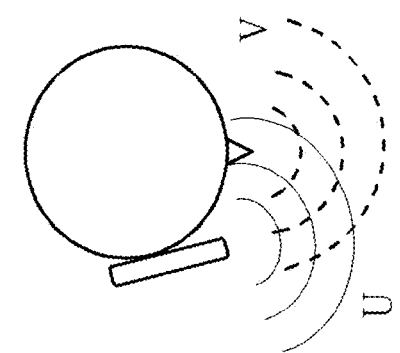
Figure 6:
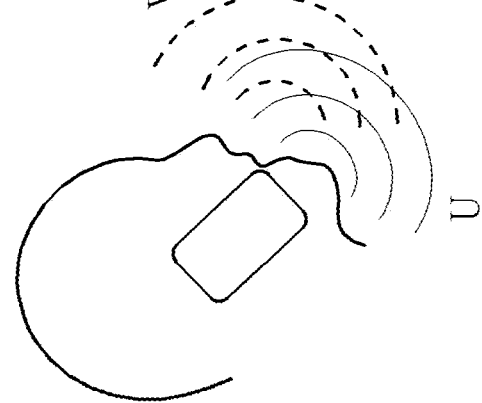

FIG. 6 illustrates scenarios of a voice sound V of the phone user and an anti-sound U produced by the auxiliary sound producing device $SPD_{aux}$. The anti-sound U is intended to cancel or eliminate the voice sound V. The voice sound V may be first captured by a sound sensing device SSD (e.g., a microphone), and the personal electronic device may perform signal processing operation on the captured voice and generate anti-sound U accordingly.

Note that, the SSD shown in FIG. 6 would perceive an aggregation sound of the anti-sound and the voice sound, denoted as U+V. Hence, there is a need to extract the voice sound V from the aggregation sound U+V.

Figure 7:
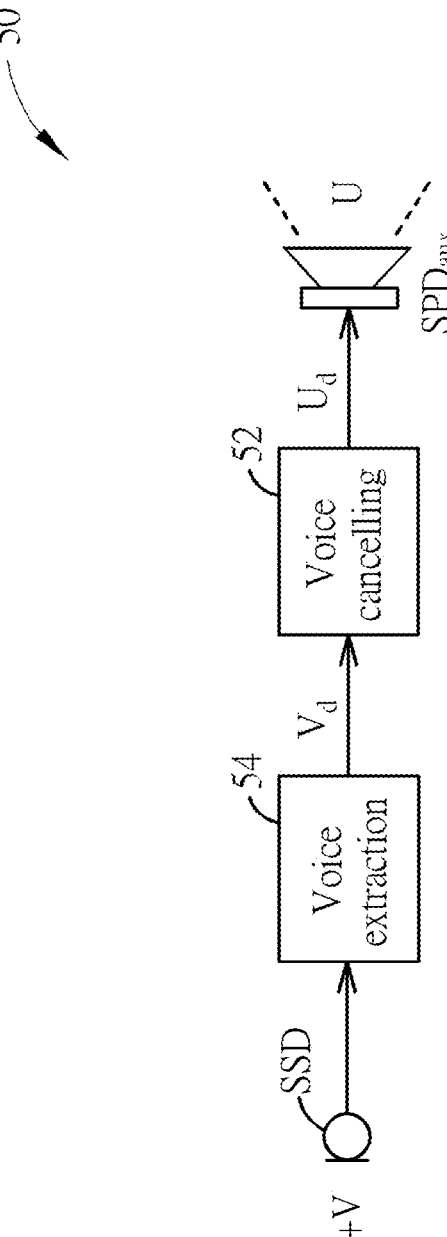
FIG. 7 is a schematic diagram of a personal electronic device according to an embodiment of the present application.

FIG. 7 illustrates a schematic diagram of a personal electronic device 50 according to an embodiment of the present application. The personal electronic device 50 comprises a voice extraction circuit 54 and a voice cancelling circuit 52. According to the aggregation sound U+V, the voice extraction circuit 54 may extract a voice signal $V_d$ corresponding to the voice sound V, where the voice signal $V_d$ may be or represent the voice sound V in digital or electrical form/format. The purpose of the voice cancelling circuit 52 is generally to minimize an acoustic energy of the aggregation sound U+V, which may be achieved by generating an anti-signal $U_d$ (by the voice cancelling circuit 52) or the anti-sound U (by the auxiliary sound producing device $SPD_{aux}$) to cancel the voice sound V or to lower an acoustic energy of the voice sound V. Adaptive cancelling algorithms may be exploited in the voice cancelling circuit 52. In addition, adaptive prediction operation known in the field of adaptive signal processing may be performed in/by the voice cancelling circuit 52 to compensate for latency or phase lag of the anti-sound U with respect to the voice sound V.

Figure 8:
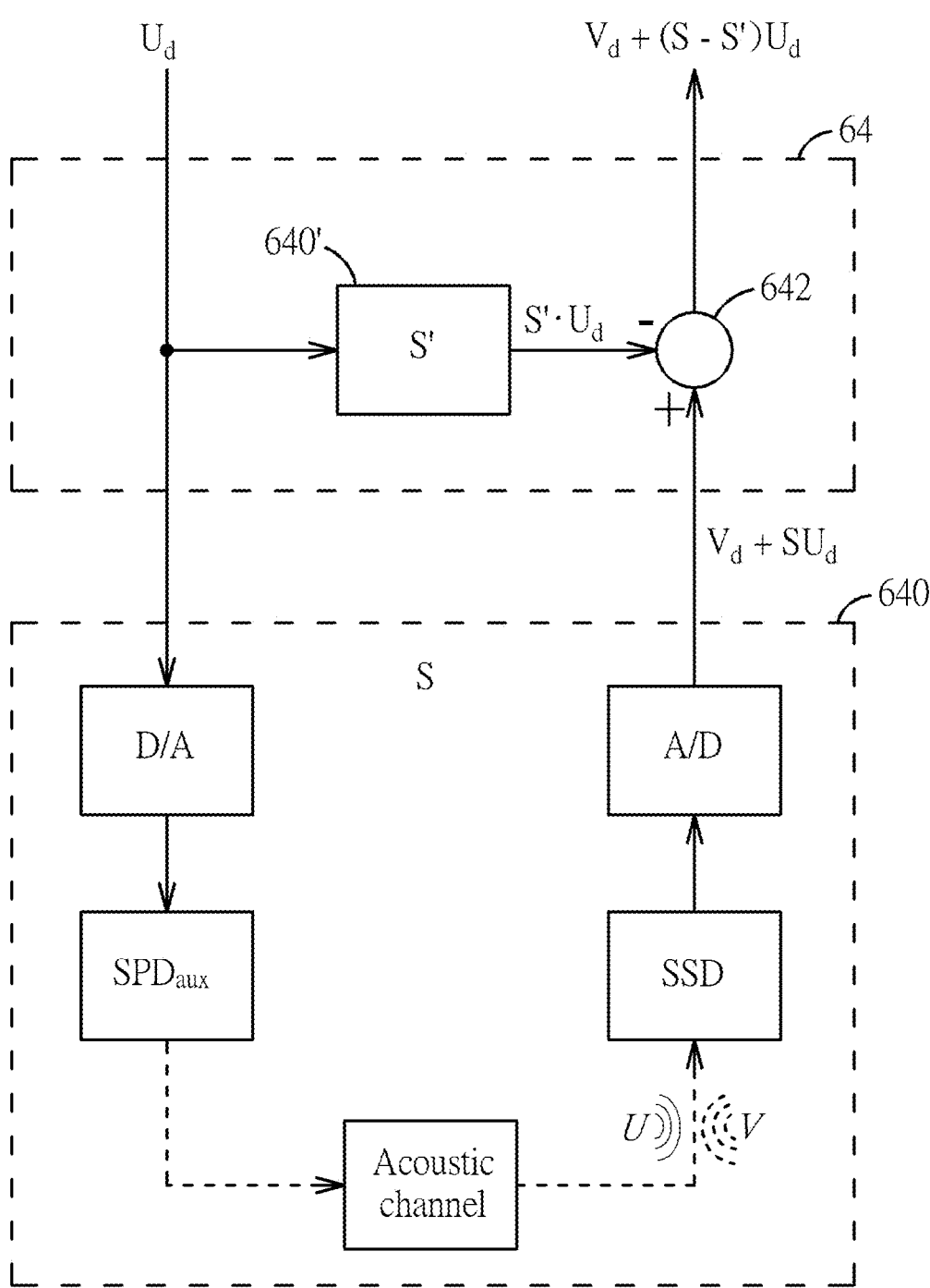
FIG. 8 is a schematic diagram of a voice extraction circuit according to an embodiment of the present application.

FIG. 8 illustrates a schematic diagram of a voice extraction circuit 64 according to an embodiment of the present application. The voice extraction circuit 64 may be used to realize the voice extraction circuit 54. The voice extraction circuit 64 comprises a channel simulator 640' and a subtractor 642.

The voice extraction circuit 64 receives the anti-signal $U_d$. The anti-signal $U_d$, assuming it is digital herein, experiences an actual equivalent channel 640. The actual equivalent channel 640 includes (or is an aggregation of) digital-to-analog converter (D/A), the auxiliary sound producing device $SPD_{aux}$, an acoustic channel from the auxiliary sound producing device $SPD_{aux}$ to the sound sensing device SSD, the sound sensing device SSD, analog-to-digital converter (A/D). The actual equivalent channel 640 has a transfer function S. An output of the analog-to-digital converter may be mathematically expressed as $V_d + S \cdot U_d$. The output signal expressed as $V_d + S \cdot U_d$ may be regarded as an aggregation signal.

On the other hand, the channel simulator 640' is designed to have a transfer function S' to approach or simulate the actual equivalent channel 640 or the transfer function S, such that S−S'→0 or |S−S'|→0, where |·| represents some norm or energy related metric of the input argument, and "→" refers to "approaches". The channel simulator 640' receives the anti-signal $U_d$ and outputs an output signal which can be mathematically expressed as $S' \cdot U_d$. The output signal expressed as $S' \cdot U_d$ may be regarded as a simulated anti-signal corresponding to the anti-sound perceived at the sound sensing device SSD.

The subtractor 642 subtracts the simulated anti-signal $S' \cdot U_d$ from the signal $V_d + S \cdot U_d$. A subtraction result would be $V_d + (S−S') \cdot U_d$, which would approach $V_d$ (i.e., $V_d + (S−S') \cdot U_d \approx V_d$) since S−S'→0. Therefore, the voice signal $V_d$ can be extracted from the aggregation sound U+V.

In an embodiment, the channel simulator 640' with transfer function S' may be implemented by an IIR (infinite impulse response) digital filter and coefficients thereof may be obtained via software simulation tool such as function of "system identification" of MATLAB, but not limited thereto.

In a short remark, in order to reduce speech intelligibility of bystanders, the auxiliary sound producing device $SPD_{aux}$ may produce anti-sound to eliminate either sound produced by the main sound producing device $SPD_{main}$ or the voice sound of the user (e.g., phone user). The auxiliary sound producing device $SPD_{aux}$ may also produce masking sound (e.g., noise with specific shaped/tuned spectrum).

Instead of spectral masking as introduced in FIGS. 3 and 4 and related paragraphs, temporal masking may be used to secure or maintain call privacy. Temporal masking refers to an increase of hearing threshold before (aka., pre-masking) and/or after (aka., post-masking) the masking sound.

An embodiment of temporal masking is generating an artificial reverberation of human voice and broadcasting the artificial reverberation, by the auxiliary sound producing device $SPD_{aux}$, toward ambient of the personal electronic device, such that the artificial reverberation would seriously disturb speech recognition in bystander's brain and bystander would hardly be able to identify what the (phone)

user is talking about. Therefore, speech intelligibility of bystanders would be significantly reduced.

Figure 9:
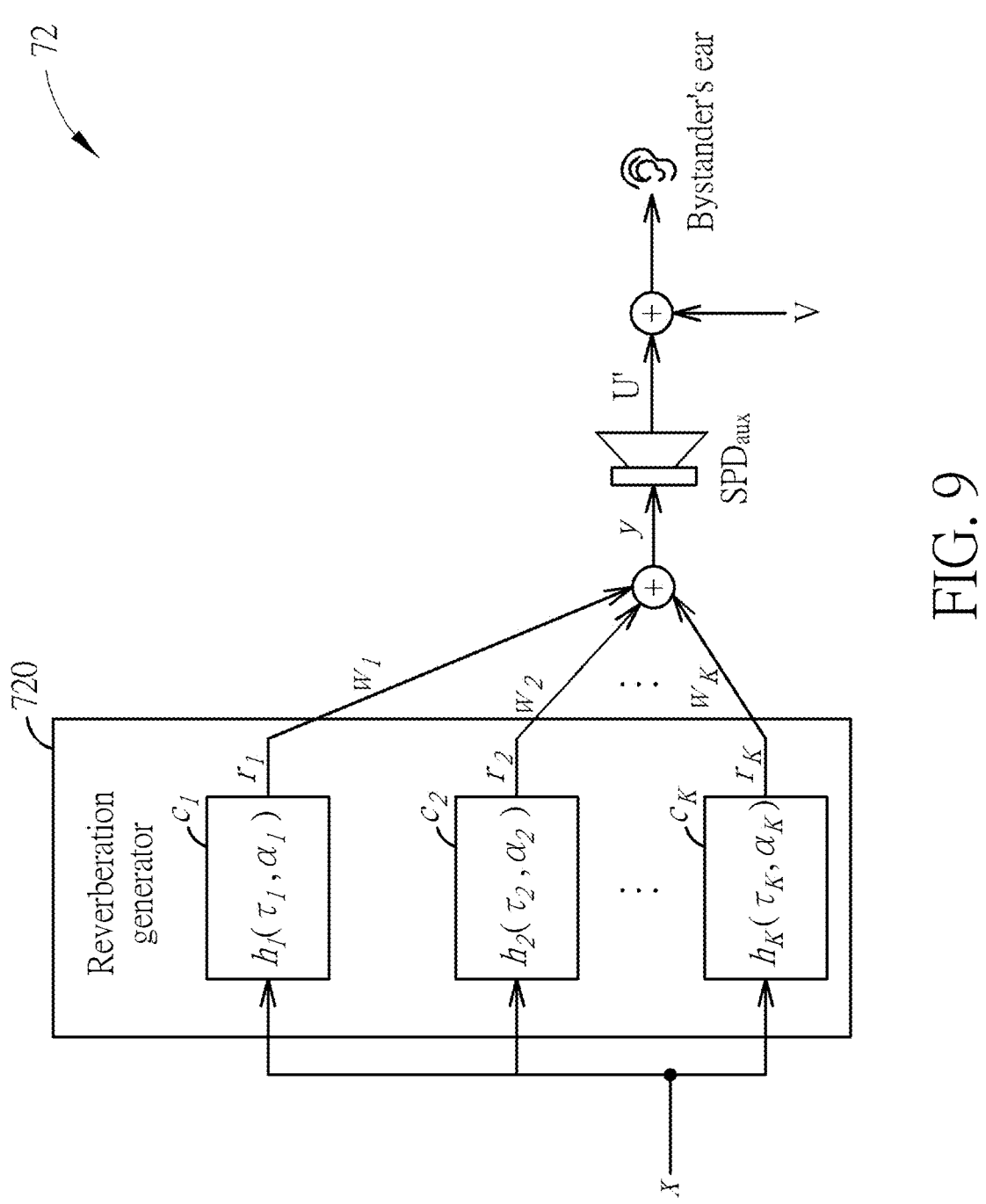
FIG. 9 is a schematic diagram of a masking sound generator according to an embodiment of the present application.

FIG. 9 illustrates a schematic diagram of a masking sound generator 72 according to an embodiment of the present application. The masking sound generator 72 comprises a reverberation generator 720. The reverberation generator 720 comprises a plurality of filters $c_1, \ldots, c_K$. In an embodiment, the filter $c_k$ may be a comb filter (e.g., $k=1, \ldots, K$), where the comb filter $c_k$ has an impulse response which can be expressed as $h_k(\tau_k, a_k)$. The impulse response $h_k(\tau_k, a_k)$ is parameterized by delay factor $\tau_k$ and attenuation/gain factor $\alpha_k$, as shown in FIG. 9. More specifically, the impulse response $h(\tau, a)$ may be $h(\tau, a)=a\cdot\delta(t-\tau)+a^2\cdot\delta(t-2\tau)+a^3\cdot\delta(t-3\tau)+a^4\cdot\delta(t-4\tau)+\ldots$ (eq. 1), which can be finite length or infinite length, where index k is omitted for brevity. The (comb) filter $c_k$ generates a reverberation component $r_k$ and the reverberation components $r_1, \ldots, r_K$ may be combined as a reverberation signal y, where y may be expressed as $y=w_1\cdot r_1+ \ldots +w_K\cdot r_K$ and $w_k$ stands for weighting factor. Source/input signal x may come from voice of the phone user himself/herself, voice of others, or a combination of voices of phone user and other people.

The auxiliary sound producing device $SPD_{aux}$ produces a reverberation sound U' according to reverberation signal y. The reverberation sound U' would disturb speech recognition on phone user's voice V in bystander's brain and bystander would barely be able to identify/decode phone user's speech. Hence, speech intelligibility of bystanders is reduced.

In a perspective, the masking sound produced by the auxiliary sound producing device $SPD_{aux}$ comprises the reverberation sound U'.

Figure 10:
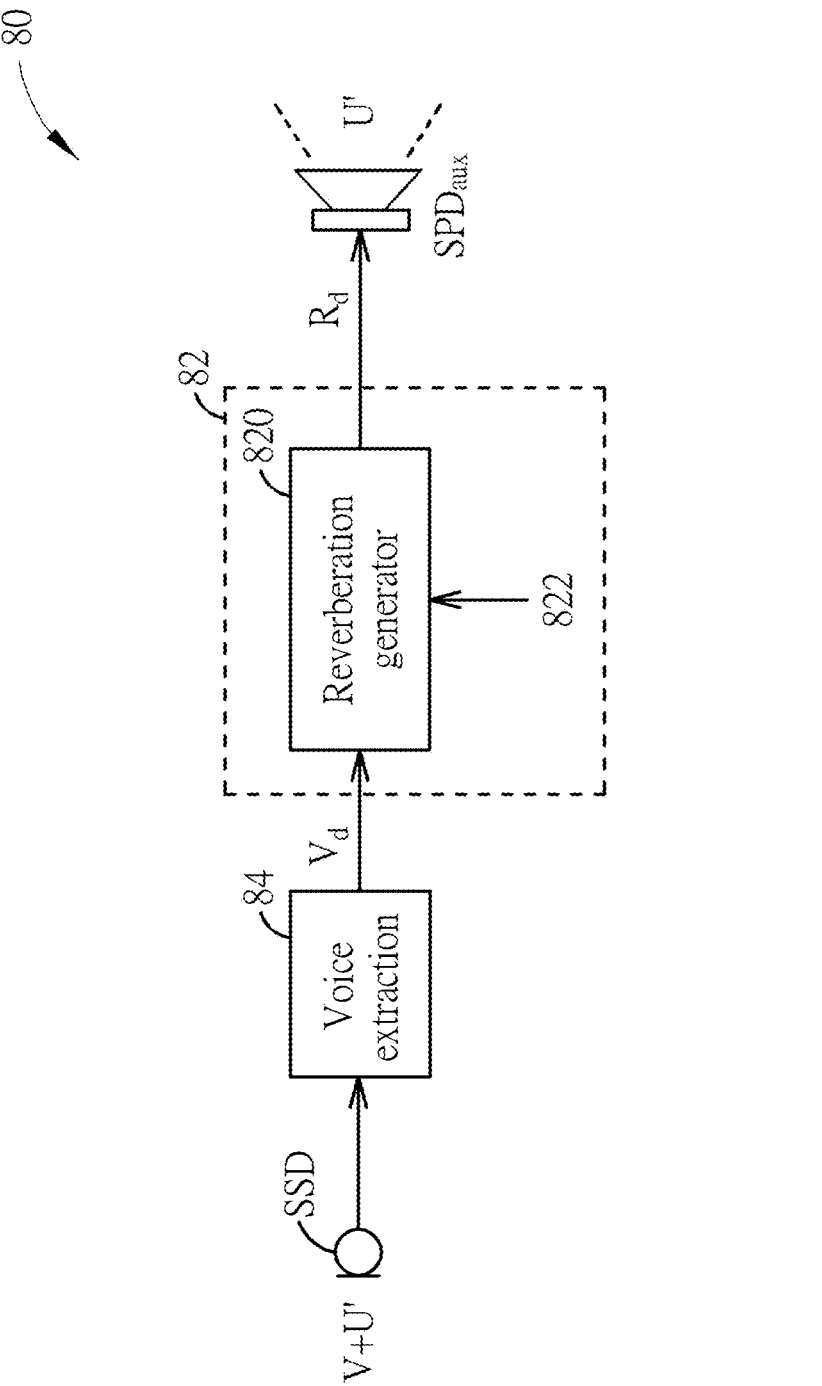
FIG. 10 is a schematic diagram of a personal electronic device according to an embodiment of the present application.

FIG. 10 illustrates a schematic diagram of a personal electronic device 80 according to an embodiment of the present application. The personal electronic device 80 comprises a voice extraction circuit 84 and a masking sound generator 82. The voice extraction circuit 84 may be realized by the voice extraction circuit 64. The masking sound generator 82 comprises a reverberation generator 820, which may be realized by the reverberation generator 720 shown in FIG. 9 or have structure similar to that of the reverberation generator 720. The reverberation generator 820 generates a reverberation signal $R_d$ so that the auxiliary sound producing device $SPD_{aux}$ can produce the reverberation sound U' to reduce speech intelligibility of bystanders. In the personal electronic device 80, the source/input signal of the reverberation generator 820 is the voice of the phone user himself/herself. Therefore, bystanders would perceive a sequence of reverberation of the phone user himself/herself, which may be less annoying than narrow band masking noise as shown in FIG. 4, and the bystanders still hard to identify the speech content of the phone user, because of the reverberation sound U'.

Optionally, the reverberation generator 820 may receive a reverberation control signal 822. In an embodiment, the reverberation control signal 822 may control a volume of the reverberation sound U' so that it would be loud enough to destroy the speech intelligibility of bystanders but not be too annoying.

Furthermore, in order to reduce bad/unpleasant experience of bystanders when producing reverberation, the reverberation generator may parse the speech into vowel segments (or vowel phonemes) and consonant segments (or consonant phonemes), where the vowel segments and the consonant segments are corresponding to various delay times and/or various repetition times, and re-mix the vowel segments and the consonant segments with various delay times and/or various repetition times. Furthermore, each phonemic segment may comprise a ramp-up portion and optionally a ramp-down portion, which may reduce annoyingness of bystanders when perceiving the reverberation.

Figure 11:
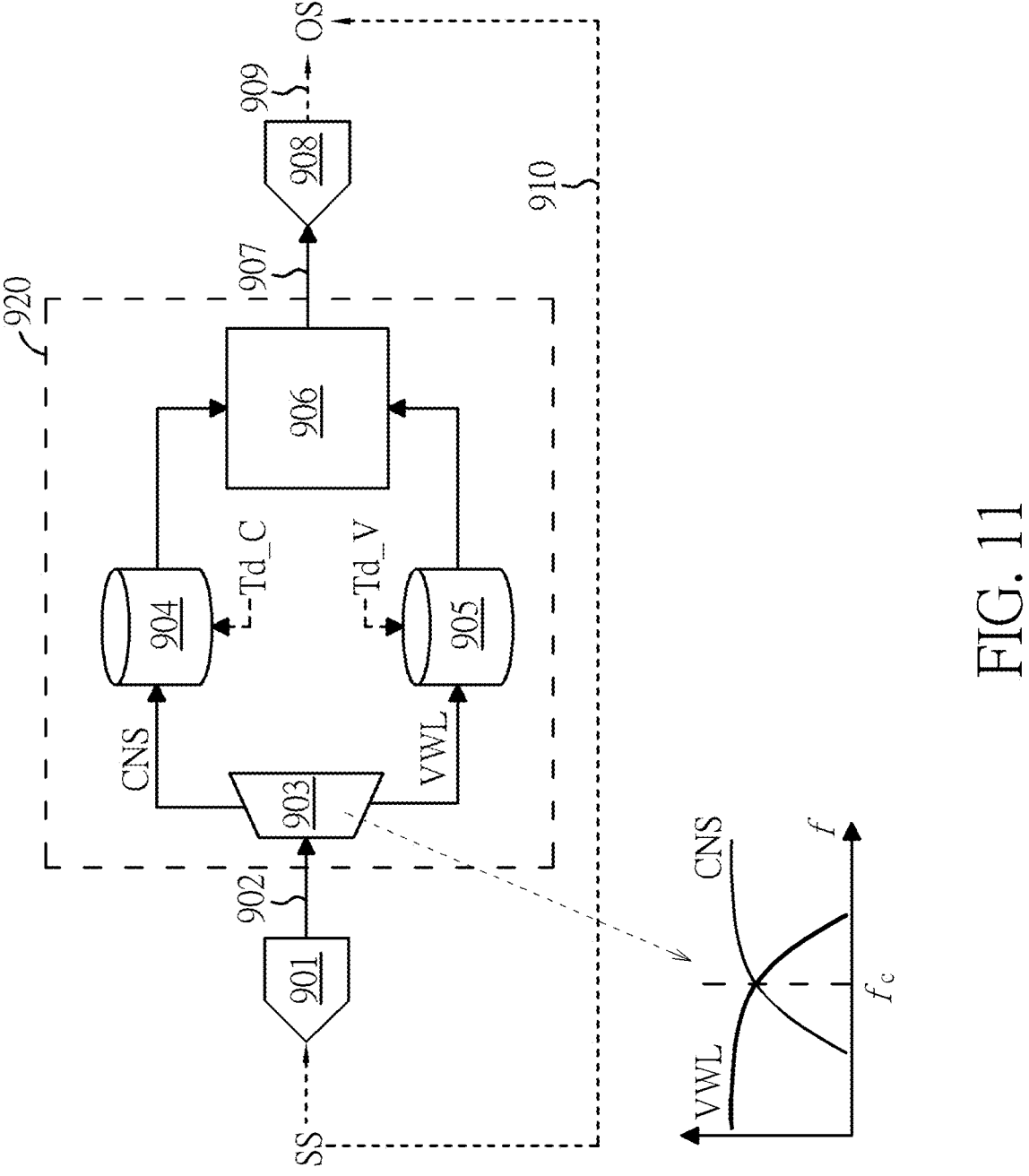
FIG. 11 is a schematic diagram of a reverberation generator according to an embodiment of the present application.

FIG. 11 illustrates a schematic diagram of a reverberation generator 920 according to an embodiment of the present application. The reverberation generator 920 comprises a parsing element 903, delay elements 904, 905, and a mixing element 906. A speech sound SS may be converted into a speech signal 902 by a converting element 901, where the converting element 901 may comprise a sound sensing device (e.g., microphone) and/or an analog-to-digital converter. The parsing element 903 may parse the speech signal 902 into consonant segments CNS and vowel segments VWL. In an embodiment, the parsing element 903 may comprise a 2-way crossover filter centered at a central frequency $f_c$, where $f_c$ may be 900~1,200 Hz (which is not limited thereto), to facilitate the parsing the vowels and the consonants. The delay elements 904 and 905 are configured to impose time delays according to time delay factors Td_C (for consonant segments) and Td_V (for vowel segments), respectively. The time-delayed vowel/consonant segments are re-mixed by the mixing element 906, where the mixing element 906 may comprise suitable mixer or adder to facilitate the mixing operation, and a masking/reverberation signal 907 is generated. A masking sound 909 is produced by a converting element 908 according to the masking/reverberation signal 907, where the converting element 908 may comprise the auxiliary sound producing device $SPD_{aux}$ and/or a digital-to-analog converter. Eventually the masking/reverberation sound 909 and the speech sound SS (through an acoustic path 910) are mixed in a neighborhood the ear of bystander as an overall sound OS, to reduce the speech intelligibility of bystanders on the speech sound SS.

In an embodiment, the delay elements 904, 905 may be realized by storage device such as FIFO (First-In, First-Out) queue or buffer, and time delay factors Td_C and Td_V may simply associate with indices for the FIFO buffers (similar to address of memory).

Figure 12:
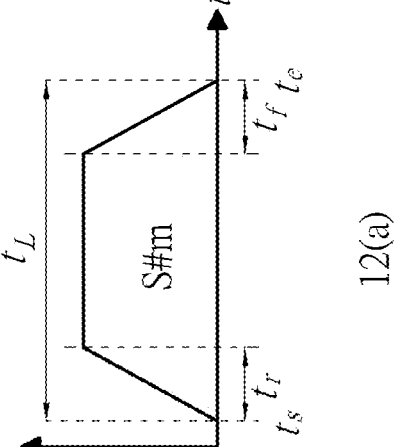
FIG. 12 illustrates timing diagrams of consonant or vowel segments according to an embodiment of the present application.

FIG. 12(*a*) illustrates a timing diagram of one single segment and FIG. 12(*b*) illustrates a timing diagram of multiple segments according to an embodiment of the present application. Vertical axis shown in FIG. 12 may associate strength of the sound (e.g., SPL, sound pressure level) corresponding to certain segment(s). S in FIG. 12(*a*) may represent C (for consonant) or V (for vowel).

The data stored in the FIFO can be retrieved by address C #x and V #y, where x, y is in the range of 0~length of FIFO minus 1. For example, if the length of FIFO is 4096, then x, y has a valid range of 0~4095.

Note that address C #x (V #y) retrieves data that corresponds to the present state of FIFO 904 (905), i.e., whenever new data is pushed into FIFO, the retrieved data will also be updated simultaneously. Due to this nature of FIFO, the data retrieved by address C #x (V #y) will correspond to CNS (VWL) generated x (y) cycles ago. For example, C #0 (V #0) will retrieve CNS (VWL) of the current cycle, with no delay, C #1 (V #1) will retrieve CNS (VWL) of the last cycle (meaning delay 1 cycle), C #m (V #m) will retrieve CNS (VWL) of m cycles ago (meaning delay m cycles), etc.

Each segment (or one segment) may have timing parameters: rise time $t_r$, fall time $t_f$, start time $t_s$, end time $t_e$ and total length $t_L$. It means, each segment (or one segment) may optionally have a ramp-up portion and a ramp-down portion.

From FIG. 12(*a*), it can be seen that each phonemic segment comprises a ramp-up portion and optionally a ramp-down portion, which is to minimize/prevent popping/ clicking noise. Timing parameters may be maintained constant or be adjusted, periodically or nonperiodically, whenever needed.

Note in FIG. 12(*b*), each VWL is followed by 1~2 segments of CNS with different delays. The rationale is, by moving the CNS, such as "s", "z", "f", "v", "th", "sh" in English, around and remixing them with VWL of different words, such that the speech comprehension process of human brain is heavily confounded, resulting in severely degraded speech intelligibility.

For example, in time slice $t_x$, segment C #a4 starts ramping down, segments V #a2, C #a3, V #a5, C #a6, V #a7 are at their full strength, and segment C #a8 is near the end of ramping up. In time slice $t_y$, segment C #a9 is half-way ramping down and segments V #a5, V #a7, V #a10, C #a11, C #a12 are their full strength (C #aN, V #aN are the FIFO addresses for certain cycle N which may be based on a random number generator or a heuristic algorithm).

Moreover, $t_w$ in FIG. 12(*b*) represents a waiting time between subsequent segments, which can be determined according to practical requirements.

In an embodiment, one segment (preferably consonant segment) may appear multiple repetition times (not shown in FIG. 12). For example, consonant segment C #a6 may appear (or be repeated) 5 or 6 times in the reverberation signal 907.

Since the key emphasis on the above rationale is regarding the shuffling of the relationship/placements of CNS relative to VWL, there are more CNS segments than VWL segments in FIG. 12(*b*). The intention is to create further confusions to the speech comprehension process of bystanders' brains by juxtaposing copies of constants around vowel randomly.

In addition to the anti-sound or the masking sound, thanks to the compact size of the sound producing device such that a plurality of auxiliary sound producing devices $SPD_{aux}$ may be disposed on one personal electronic device, acoustic directional control (similar to beamforming) may be exploited in the call direction. The personal electronic device may identify a position or a certain angular direction of a bystander and form an acoustic beam so as to nullify or minimize an acoustic energy toward that certain angular direction of the bystander, so as to achieve an effect of reducing speech intelligibility of the bystander.

Figure 13:
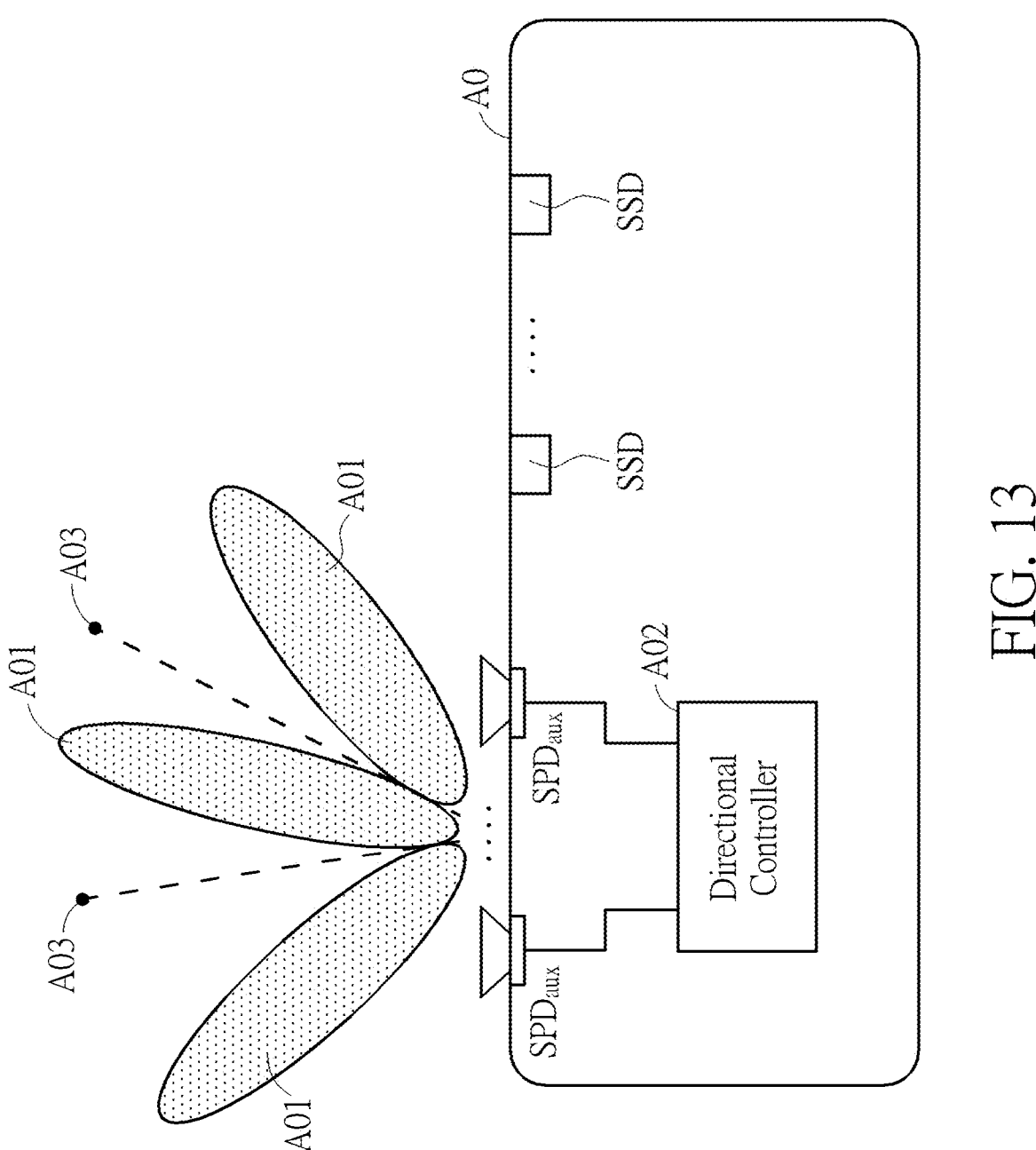
FIG. 13 illustrates a schematic diagram of a personal electronic device according to an embodiment of the present application.

FIG. 13 illustrates a schematic diagram of a personal electronic device A0 according to an embodiment of the present application. The personal electronic device A0 may comprise a plurality of auxiliary sound producing devices $SPD_{aux}$ and a directional controller A02. The auxiliary sound producing device(s) $SPD_{aux}$ herein may be realized by or comprise an APG device. The directional controller A02 is configured to generate a weighting vector comprising a plurality of weighting for the plurality of auxiliary sound producing devices $SPD_{aux}$ to perform acoustic beamforming or to form acoustic beams A01. Beamforming algorithms may be referred to which of the EM (electromagnetic) wave beamforming, which is known by the art and not narrated herein for brevity. In an embodiment, forming the acoustic beams A01 can nullify acoustic energy toward specific angular directions of the bystanders A03 relative to the personal electronic device A0, thereby reducing speech intelligibility of the bystander.

In addition, the personal electronic device A0 may also comprise a plurality of sound sensing devices SSD. The plurality of sound sensing devices SSD, which may form as a microphone array, is configured to identify angular direction of the bystander relative to the personal electronic device.

Note that, FIG. 13 is only for illustrating the personal electronic device with multiple auxiliary sound producing devices $SPD_{aux}$ and multiple sound sensing devices SSD. Arrangement of $SPD_{aux}$ and SSD may be designed according to practical requirements, which is not limited thereto.

In short, the present application exploits auxiliary sound producing device(s) to produce anti-sound, masking sound, or reverberation sound or to perform acoustic beamforming, to reduce speech intelligibility of bystanders.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A personal electronic device, comprising:
   a main sound producing device, configured to produce an intended sound for an intended user; and
   an auxiliary sound producing device, configured to produce a masking sound or an anti-sound to reduce a speech intelligibility of a bystander within a neighborhood of the intended user of the personal electronic device,
   wherein the auxiliary sound producing device comprises an air pulse generating device;
   wherein the air pulse generating device produces the masking sound or the anti-sound via generating a plurality of air pulses at an ultrasonic pulse rate.

2. The personal electronic device of claim 1, wherein the auxiliary sound producing device is disposed on a bottom edge or a side edge of the personal electronic device.

3. The personal electronic device of claim 1, wherein the auxiliary sound producing device is disposed on a back side of the personal electronic device.

4. The personal electronic device of claim 1, wherein the auxiliary sound producing device produces the masking sound or the anti-sound toward an ambient of the personal electronic device.

5. The personal electronic device of claim 1, wherein the auxiliary sound producing device produces the masking sound, and the masking sound comprises a bandlimited noise.

6. The personal electronic device of claim 5, wherein a noise power of the bandlimited noise concentrates within a noise band;
   wherein the noise band covers a spectrum of consonants of human voice.

7. The personal electronic device of claim 1, wherein the auxiliary sound producing device produces the masking sound, and the masking sound comprises a plurality of narrow band sounds at a plurality of masking frequency tones;
   wherein the plurality of masking frequency tones spreads over a consonant band or a voice band.

8. The personal electronic device of claim 1, wherein the auxiliary sound producing device produces the masking sound, and the masking sound comprises a reverberation of user voice.

9. The personal electronic device of claim 1, comprising:
   a masking sound generator, configured to generate the masking sound.

10. The personal electronic device of claim 9, wherein the masking sound generator comprises a filter, configured to generate a bandlimited noise as the masking sound or a portion of the masking sound;

wherein the bandlimited noise concentrates within a noise band;

wherein the noise band covers a spectrum of consonants of human voice.

11. The personal electronic device of claim 9, wherein the masking sound generator comprises a reverberation generator, configured to generate a reverberation sound of a voice;

wherein the masking sound comprises the reverberation sound.

12. The personal electronic device of claim 11, wherein the reverberation generator comprises a plurality of filters, configured to generate a plurality of reverberation components;

wherein the plurality of reverberation components is combined as a reverberation signal, such that the auxiliary sound producing device produce the reverberation sound according to the reverberation signal.

13. The personal electronic device of claim 11, wherein the reverberation generator comprises:

a parsing element, receiving a speech signal and configured to parse the speech signal into a plurality of consonant segments and a plurality of vowel segments;

a first delay element, configured to impose first time delays for the consonant segments;

a second delay element, configured to impose second time delays for the vowel segments; and a mixing element, configured to mix the time-delayed consonant segments and the time-delayed vowel segments to form a reverberation signal.

14. The personal electronic device of claim 13, wherein a segment, among the consonant segments and the vowel segments, comprises a ramp-up portion and a ramp-down portion.

15. The personal electronic device of claim 11, wherein the reverberation generator receives a reverberation control signal to control a volume of the reverberation sound.

16. The personal electronic device of claim 1, comprising:

a voice cancelling circuit, configured to generate an anti-signal for the auxiliary sound producing device to produce the anti-sound.

17. The personal electronic device of claim 16, wherein an adaptive prediction operation is performed by the voice cancelling circuit to generate the anti-signal.

18. The personal electronic device of claim 1, comprising:

a voice extraction circuit, coupled between a sound sensing device and the voice cancelling circuit, configured to extract a voice signal corresponding to a voice sound according to an aggregation sound perceived by the sound sensing device.

19. The personal electronic device of claim 18, wherein the voice extraction circuit comprises a channel simulator and a subtractor;

wherein the channel simulator is configured to generate a simulated anti-signal, and the subtractor is configured to subtract the simulated anti-signal from an aggregation signal.

20. The personal electronic device of claim 1, comprising:

a sensor, configured to detect whether the personal electronic device is attached to a user;

wherein an amplitude of the anti-sound is determined according to a detection result of the sensor.

\* \* \* \* \*